Sept. 16, 1941.  W. M. HANNEMAN  2,255,997

THREAD CUTTING SCREW

Filed April 10, 1941

INVENTOR.

Walter M. Hanneman

BY Cox, Moore & Olson attys.

Patented Sept. 16, 1941

2,255,997

UNITED STATES PATENT OFFICE 2,255,997

THREAD CUTTING SCREW

Walter M. Hanneman, Oak Park, Ill., assignor to Illinois Tool Works, Chicago, Ill., a corporation of Illinois Application April 10, 1941, Serial No. 387,917

5 Claims. (Cl. 85—47)

This invention relates generally to thread cutting screws and more particularly to thread cutting screws adapted for use in plastics, such, for example, as cellulose acetate and the like.

Experience has shown that when conventional thread forming screws not designed to actually cut a thread but rather to indent a thread are inserted within an unthreaded aperture of certain plastic materials, internal stresses are set up within the material which often lead to fracture or failure of the material. It has also been found that if the thread is to be cut in such plastic material, the chips resulting from the cutting action must not be permitted to accumulate. It has also been found that screws employed in plastic material, such as cellulose acetate, have a tendency to strip the threads in the work piece when the head of the screw is tightened against the work piece.

It is an object of the present invention to provide a thread cutting screw for use in plastics and the like which will be free from the disadvantages and inconveniences referred to above and which is capable of being economically produced.

More specifically, the invention contemplates a thread cutting screw equipped with an aggressive serrated cutting edge in association with a chip deflecting surface arrangement which will effectively direct or divert chips away from the screw body as they are formed by the cutting edge.

The invention also contemplates a thread cutting screw as referred to above wherein the thread configuration employed in operative association with the aforesaid serrated cutting edge is such as to reduce to a minimum tendencies for stripping the thread in the work after the screw head has been tightened against the work surface.

The foregoing and other objects and advantages will be more apparent from the following detailed description when considered in connection with the accompanying drawing, wherein.

Figure 1:
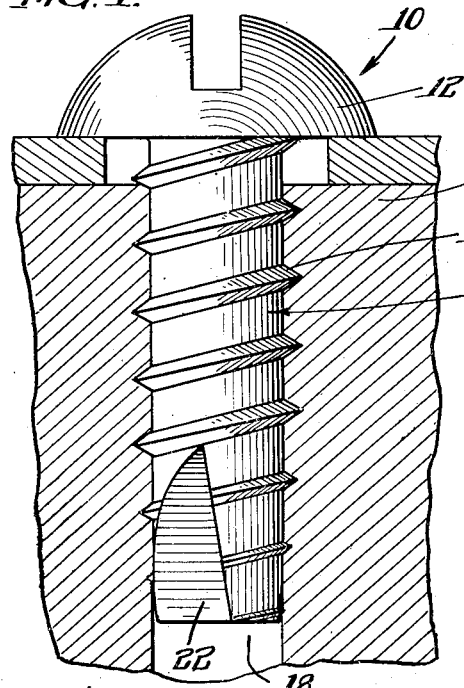
Fig. 1 is an elevational view of a thread cutting screw embodying features of the present invention, said screw being shown in operative association with an apertured work piece.
Figure 2:
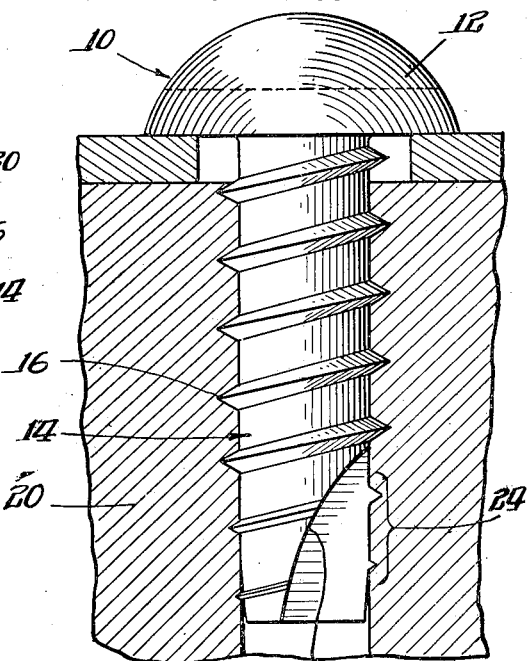
Fig. 2 is a view similar to Fig. 1 as viewed in section from the left of Fig. 1.

Referring now to the drawing more in detail wherein like numerals have been employed to designate similar parts throughout the various figures, it will be seen that the invention contemplates a thread cutting screw designated generally by the numeral 10. This screw 10 includes a head 12 and a threaded body portion 14. It is to be noted that the threaded body portion 14 is provided with a relatively coarse pitch V-thread 16. Due to the coarseness of the pitch, a helical cylindrical area is presented between the thread convolutions. In order to facilitate initial entry of the screw within an unthreaded aperture 18 of a work piece 20, the thread convolutions 16 gradually decrease in external diameter toward the entering end of the screw. In some instances it may be desirable to taper both the thread and the screw body extending between the thread convolutions at the entering end. The thread convolutions of diminishing diameter at the entering end of the screw are traversed by a recess or opening 22 so as to provide a serrated cutting edge 24. This recess 22 is defined by two surfaces 26 and 28 which are normal to each other. The surface 26 is preferably flat and is preferably though not necessarily inclined slightly with respect to the screw axis. In fact, I have found it desirable in certain instances to have the flat surface 26 extending substantially normal to the thread helix, as clearly illustrated in Fig. 1. The other surface 28 is of curved or concave form. The recess 22 may be produced by the use of a conventional milling cutter.

Figure 3:
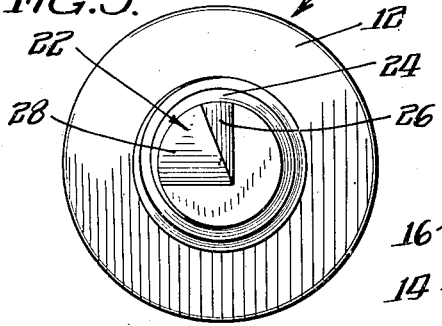
Fig. 3 is an end elevational view of the screw as shown in Fig. 1 to more clearly illustrate the opening and deflecting surface area for receiving and efficiently diverting chips received from the serrated cutting edge.
Figure 4:
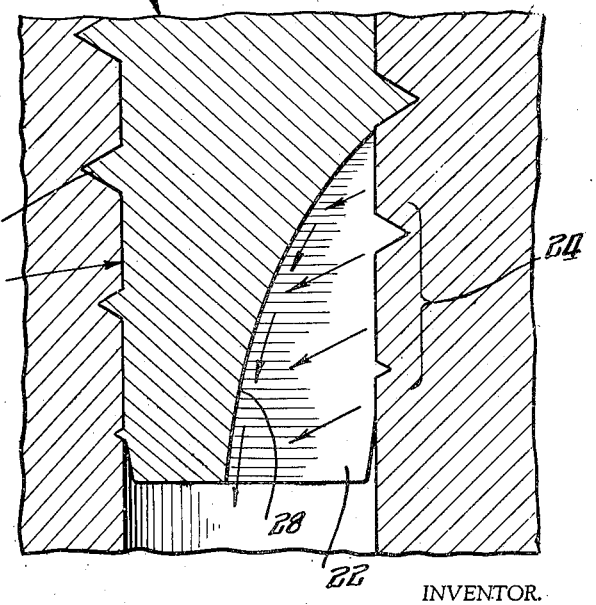
Fig. 4 is an enlarged sectional view similar to the lower portion of Fig. 2 to more clearly illustrate the manner in which the chips formed by the action of the serrated cutting edge are directed against the chip diverting surface.

It will be noted in Fig. 3 that the surface 26 at the entering extremity of the screw and for a given distance from said entering extremity is positioned to the right of the screw axis or to the right of a vertical plane including the screw axis as viewed in Figs. 1 and 3. This arrangement insures the presence of an acute cutting edge at the entering extremity of the screw and thus materially facilitates the initial cutting action as the screw is turned within the unthreaded aperture of the work. By having the surface 26 slightly inclined with respect to the screw axis, chips formed by the cutting edge brought into engagement with the surface 24 are deflected downwardly or forwardly from the screw. The inclined or arcuate disposition of the surface 28 also serves to deflect chips downwardly or forwardly of the screw movement, as illustrated by the directional arrows in Fig. 4. It will be noted that the portion of the surface 28 in the vicinity of the entering extremity of the screw is positioned below a horizontal plane coincident with the screw axis, as viewed in Fig. 3. Thus, the two surfaces 26 and 28 cooperate to provide a relatively large recess or opening which greatly facilitates the discharge of work chips away from the cutting edge. Chips cut from plastic materials such as cellulose acetate and the like have a tendency to clog and thus seriously impair the functioning of a thread forming screw unless provision is made for unobstructed egress of the chips at the entering extremity of the screw member. Experience has shown that a screw provided with the type of recess, cutting edge and thread convolutions illustrated herein will function efficiently in plastic materials of the type which have a tendency to clog a screw when chips are removed therefrom.

Particular attention is directed to the relatively coarse pitch of the thread convolution 16. This type of thread cooperates with the transverse opening of recess 22 at the entering end in providing a coarse toothed edge which will readily cut its way into plastic materials. The teeth presented along the cutting edge are axially spaced due to the coarseness of the pitch and hence facilitate the initial thread forming or cutting in the work. This initial cutting is followed by the tight perfect fitting of the full height and diameter thread convolutions as illustrated in the drawing. As the head 12 is tightened against the external surface of the work, there obviously is a tendency for the screw thread convolutions to exert an axial pull upon the work. Due to the coarse pitch or lead of the thread, the turning force beyond which stripping of the work threads will occur, may be readily detected by the user. The finer the pitch of the thread becomes, the greater tendency there is for an operator to exert a force which will cause stripping of the thread. That is to say, the sensitivity of the coarse pitch screw to torque variations within the range between those torque forces necessary to rotatably insert the screw within the work piece and those torque forces which will produce rupture or stripping of the work after the screw head has been clamped against the work is greater than the sensitivity of a fine pitch screw of otherwise like size and character.

Figure 5:
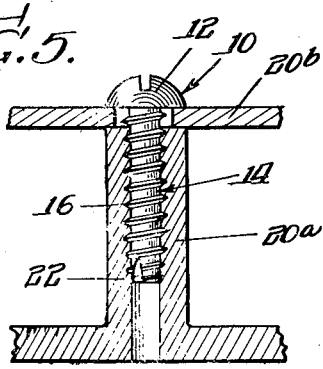
Fig. 5 illustrates a practical application of the screw of the present invention to a conventional plastic body of tubular form.

It will be apparent from the foregoing description that the invention contemplates a thread cutting screw of novel and practical construction. In Fig. 5 a typical example of a fastening problem is disclosed which the present invention solves. The screw is shown in operative association with the unthreaded aperture of a tubular plastic member or work piece 20a against which is clamped a piece of sheet material 20b. The presence of the serrated cutting edge, chip receiving opening or recess and the thread convolutions of relatively coarse pitch positively prevents any failure of the material of the tube structure 20a during the insertion of the screw member. Even though the tubular structure 20a is relatively thin, the stresses set up within the material as a result of the application thereto of the thread cutting screw will not introduce failure or fracture. The application shown in Fig. 5 is only one of many instances where the screw of the present invention may be used as a thread cutting fastener in plastic materials without experiencing the deleterious effects referred to above.

It will be understood from the above that the invention contemplates a screw wherein the chips formed by the cutting edge are not obstructed by an adjacent wall but are free to experience curling or turbulence within the relatively large area provided by the recess. In other words, the deflecting surface 28 is disposed at a relatively large angle, preferably ninety degrees, to the surface 26. Hence, when the plastic chips which curl away from the coarse toothed cutting edge eventually engage the surface 28 they are substantially free to be deflected axially and will not crowd against said surface. The present construction is to be distinguished from relatively narrow slots or grooves in thread cutting screws which do not permit free movement of chips away from the cutting edge as described above but cause the chips to become crowded within the slot and thus impair the thread cutting efficiency of the screw. In this connection it should be understood that the screw of the present invention is particularly adapted and designed for use in relatively soft flexible plastics such as polystyrene, cellulose acetate, et cetera, commonly known as thermoplastic materials. Chips from such materials have a much greater tendency to clog within a recess than chips of the harder type plastics such as thermosetting materials, for example, Bakelite. The chips of these harder plastic materials exert a much less tendency to crowd within a recess and hence narrower recesses than the recess disclosed herein have been commercially used with these harder plastic materials.

It may be said that the threaded screw shank of the present invention comprises a holding section and an entering section, the latter section presenting a relatively coarse toothed serrated cutting edge, and this cutting edge is associated with a recess of substantial cross-sectional area as compared with the total cross-sectional area of the screw shank in that vicinity. In fact, the cross-sectional area of the recess at the entering extremity of the screw shank forms a substantial portion (in the disclosed embodiment over 25%) of the total circular cross-sectional area of the screw. Thus, the recess not only provides a reservoir of ample magnitude for receiving chips but also enables the chips to be ejected from and not crowded within the recess as the screw is turned into the unthreaded aperture of the plastic material.

It should also be understood that I have found it practical to employ recesses bounded by a wall such as the wall 26 which extends parallel with the screw axis and is coincident therewith. In such instances I prefer to position the surface 28 at the entering extremity of the screw below the horizontal plane coincident with the screw axis as illustrated in Fig. 3. In other words, the surface area bounding the recess must cooperate in deflecting the chips formed by the cutting edge and this deflecting surface must be positioned a sufficient angular distance away from the other bounding surface to afford ample chip accommodating space.

Obviously the invention is not limited to the structural features disclosed herein but is capable of other modifications and changes without departing from the spirit and scope of the appended claims.

The invention is hereby claimed as follows:

1. A thread cutting screw for use in materials such as plastics and other materials exhibiting like characteristics including a threaded shank having a holding section and an entering section, and a screw head formed integral with the shank, the thread on said shank being of relatively coarse pitch, the thread convolutions of said entering section diminishing in external diameter to facilitate entrance within an unthreaded aperture and traversed by a recess to provide a relatively coarse tooth serrated cutting edge, said recess being defined by two normally intersecting surfaces one of which is flat and traverses the entering thread convolutions to form the aforesaid cutting edge and the other arcuate for deflecting chips away from said cutting edge, the cross-sectional area of said recess at the entering extremity of the screw shank forming a substantial portion of the total circular cross-sectional area of the screw in that vicinity to provide ample chip receiving space.

2. A thread cutting screw for use in materials such as plastics and other materials exhibiting like characteristics including a threaded shank having a holding section and a blunt ended entering section, and a screw head formed integral with the shank, the thread convolutions of the entering section gradually diminishing in external diameter to facilitate entrance within an unthreaded aperture and traversed by a recess to provide a serrated cutting edge, said recess being defined by a pair of normally intersecting surfaces traversing the entering thread convolutions, one of said surfaces being flat and traversing said entering thread convolutions to form the aforesaid serrated cutting edge and the other surface being arcuate for deflecting chips away from said cutting edge, the cross-sectional area of said recess at the blunt entering end of the screw blank forming a substantial portion of the total circular cross-sectional area of the screw in that vicinity to provide ample chip receiving space, said recess terminating short of the head of the screw.

3. A thread cutting screw including a threaded shank having a holding section and an entering section, and a screw head formed integral with the shank, the thread convolutions of said entering section diminishing in external diameter to facilitate entrance within an unthreaded aperture and traversed by a recess to provide a serrated cutting edge, said recess being defined by two intersecting surfaces one of which is relatively flat and traverses the entering thread convolutions to form the aforesaid cutting edge and the other of which is arranged for deflecting chips away from said cutting edge, the cross sectional area of said recess at the entering extremity of the screw shank being at least one-fourth the total cross sectional area of the screw in that vicinity to provide ample chip receiving space.

4. A thread cutting screw including a threaded shank having a holding section and an entering section, and a screw head formed integral with the shank, the thread convolutions of said entering section diminishing in external diameter to facilitate entrance within an unthreaded aperture and traversed by a recess to provide a serrated cutting edge, said recess being defined by two intersecting surfaces one of which is relatively flat and traverses the entering thread convolutions to form the aforesaid cutting edge and the other of which is arranged for deflecting chips away from said cutting edge, the cross sectional area of said recess at the entering extremity of the screw shank forming a substantial portion of the total circular cross sectional area of the screw at said entering extremity to provide ample chip receiving space, and said surfaces intersecting at said extremity in a line disposed inwardly a distance at least to the vicinity of the central axis of the shank.

5. A thread cutting screw including a threaded shank having a holding section and an entering section, and a screw head formed integral with the shank, the thread convolutions of said entering section diminishing in external diameter to facilitate entrance within an unthreaded aperture, and traversed by a recess to provide a serrated cutting edge, said recess being defined by two surfaces intersecting at substantially a right angle, one of which surfaces is relatively flat and traverses the entering thread convolutions to form the aforesaid cutting edge and the other arcuate for deflecting chips away from said cutting edge, the cross sectional area of said recess at the entering extremity of the screw shank forming a substantial portion of the total circular cross sectional area of the screw in that vicinity to provide ample chip receiving space.

WALTER M. HANNEMAN.